United States Patent
Anandan et al.

(10) Patent No.: US 6,192,145 B1
(45) Date of Patent: *Feb. 20, 2001

(54) METHOD AND APPARATUS FOR THREE-DIMENSIONAL SCENE PROCESSING USING PARALLAX GEOMETRY OF PAIRS OF POINTS

(75) Inventors: Padmanabhan Anandan, Princeton, NJ (US); Michal Irani, Rehovot (IL)

(73) Assignee: Sarnoff Corporation, Princeton, NJ (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/798,857

(22) Filed: Feb. 11, 1997

Related U.S. Application Data

(60) Provisional application No. 60/011,524, filed on Feb. 12, 1996.

(51) Int. Cl.[7] .................................................. G06K 9/00
(52) U.S. Cl. .................... 382/154; 359/470; 382/107; 382/236
(58) Field of Search .................... 382/285, 106, 382/100, 103, 107, 108, 154, 236, 287, 291, 294; 356/12; 359/462, 470; 345/424, 425

(56) References Cited

U.S. PATENT DOCUMENTS

| | | | |
|---|---|---|---|
| 3,715,482 | * 2/1973 | Haines et al. | 367/8 |
| 4,573,191 | 2/1986 | Kidode et al. | 382/106 |
| 4,654,872 | 3/1987 | Hisano et al. | 382/154 |
| 4,669,048 | * 5/1987 | Ackermann et al. | 382/154 |
| 4,908,573 | * 3/1990 | Kaufman et al. | 324/309 |
| 4,982,438 | * 1/1991 | Usami et al. | 382/154 |
| 4,985,856 | * 1/1991 | Kaufman et al. | 345/424 |
| 5,076,687 | * 12/1991 | Adelson | 356/4.04 |

(List continued on next page.)

OTHER PUBLICATIONS

Sinclair et al., "Further constraints on visual articulated motions", Institute for Computer Graphics, IEEE 1996, oo. 94–99.*

Sawhney, "3D Geometry from Planar Parallax", Machine Vision Group, IEEE, 1994, pp. 929–934.*

Boufama et al., "Epipole and fundamental matrix estimation using virtual parallax", LIFIA–INRIA, IEEE, 1995, pp. 1030–1036.*

Copy of International Search Report dated Jun. 9, 1997, from corresponding international application.

(List continued on next page.)

*Primary Examiner*—Jon Chang
*Assistant Examiner*—Jayanti K. Patel
(74) *Attorney, Agent, or Firm*—William J. Burke

(57) ABSTRACT

A method and apparatus for processing a geometric relationship between the image motion of pairs of points over multiple image frames representing a three-dimensional scene. This relationship is based on the parallax motion of points with respect to an arbitrary planar surface, and does not involve epipolar geometry. A constraint is derived over two frames for any pair of points, relating their projective structure (with respect to the plane) based only on their image coordinates and their parallax displacements. Similarly, a 3D-rigidity constraint between pairs of points over multiple frames is derived. Also disclosed are applications of these parallax-based constraints to solving three important problems in 3D scene analysis: (i) the recovery of 3D scene structure, (ii) the detection of moving objects in the presence of camera induced motion, and (iii) the synthesis of new camera views based on a given set of views. Moreover, this approach can handle difficult situations for 3D scene analysis, e.g., where there is only a small set of parallax vectors, and in the presence of independently moving objects.

19 Claims, 8 Drawing Sheets

U.S. PATENT DOCUMENTS

| | | | |
|---|---|---|---|
| 5,185,671 | * 2/1993 | Lieberman et al. | 348/229 |
| 5,249,035 | 9/1993 | Yamanaka | 356/376 |
| 5,390,024 | * 2/1995 | Wright | 356/376 |
| 5,448,687 | * 9/1995 | Hoogerhyde et al. | 345/425 |
| 5,473,364 | 12/1995 | Burt | 348/47 |
| 5,490,133 | * 2/1996 | Nakamura et al. | 369/44.23 |
| 5,495,576 | * 2/1996 | Ritchey | 345/425 |
| 5,528,194 | * 6/1996 | Ohtani et al. | 382/293 |
| 5,577,130 | 11/1996 | Wu | 382/106 |
| 5,586,231 | 12/1996 | Florent et al. | 345/425 |
| 5,623,528 | * 4/1997 | Takeda | 378/2 |
| 5,644,651 | * 7/1997 | Cox et al. | 382/154 |
| 5,680,474 | * 10/1997 | Iijima et al. | 382/154 |
| 5,694,531 | * 12/1997 | Golin et al. | 345/419 |
| 5,696,551 | * 12/1997 | Katto | 348/43 |
| 5,703,961 | * 12/1997 | Rogina et al. | 382/154 |
| 5,706,416 | * 1/1998 | Mann et al. | 345/427 |
| 5,764,871 | * 6/1998 | Fogel | 345/427 |
| 5,821,943 | * 10/1998 | Shashua | 345/427 |
| 5,828,793 | * 10/1998 | Mann | 382/284 |
| 5,852,672 | * 12/1998 | Lu | 382/154 |
| 5,986,668 | * 11/1999 | Szeliski et al. | 345/433 |

OTHER PUBLICATIONS

J.R. Bergen, P. Anandan, K. J. Hanna, and R. Hingorani. "Hierarchial Model–based Motion Estimation" in *European Conference on Computer Vision*, pp. 237–252, Santa Margarita Ligure, May 1992.

J.R. Bergen, P. J. Burt, K. Hanna, R. Hingorani, P., Jeanne, and S. Peleg. "Dynamic Multiple–Motion Computation" In Y. A. Feldman and A. Bruckstein, editors, *Artificial Intellegience and Computer Computer Vision: Proceedings of the Israeli Conference*, pp. 147–156. Elsevier, 1991.

J. R. Bergen, P. J. Burt, R. Hingorani, and S. Peleg. "A Three–frame Algorithm For Estimating Two–component Image Motion" *IEEE Trans. on Pattern Analysis and Machine Intelligence*, 14:886–8895, 895 Sep. 1992.

P.J. Burt, R. Hingorani, and R.J. Kolczynski. "Mechanisms For Isolating Component Patterns In The Sequential Analysis Of Multiple Motion" In *IEEE Workshop on Visual Motion*, pp. 187–193, Princeton, New Jersey, Oct. 1991.

S. Carlsson. "Duality of Reconstruction And Positioning From Projective Views" In *Workshop on Representations of Visual Scenes*, 1995.

T. Darrell and A. Pentland. "Robust Estimation of a Multi–layered Motion Representation". In *IEEE Workshop on Visual Motion*, pp. 173–178, Princeton, New Jersey, Oct. 1991.

T. Darrell and E. Simoncelli. "Nulling" Filters and The Separation of Transparent Motions In *IEEE Conference on Computer Vision and Pattern Recognition*, pp. 738–739, New York, Jun. 1993.

O. Faugeras and L. Robert. "What Can Two Images Tell Us About A Third One?" In *European* Conference *Conference on Computer Vision*, pp. 485–492, May 1994.

O.D. Faugeras. "What Can Be Seen In Three Dimensions With An Uncalibrated Stereo Rig?" in European *European Conference on Computer Vision*, pp. 563–578, Santa Margarita Ligure, May 1992.

O.D. Faugeras and B. Mourrain. "On the Geometry and Algebra of the Point and Line Correspondences Between n Images" In *International Conference on Computer Vision*, pp. 951–956, Cambridge, MA Jun. 1995.

K. Hanna. "Direct Multi–resolution Estimation of Ego–motion and Structure From Motion". In *IEEE* Work *Workshop on Visual Motion*, pp. 156–162, Princeton, NJ Oct. 1991.

R. Hartley, R. Gupta, and T. Chang. "Stereo From Uncalibrated Cameras" In *IEEE Conference on Computer Vision and Pattern Recognition*, Jun. 1992.

M. Irani, B. Rousso, and S. Peleg. "Detecting and Tracking Multiple Moving Objects Using Temporal Integration" In *European Conference on Computer Vision*, pp. 282–287, Santa Margarita Ligure, May 1992.

M. Irani, B. Rousso, and S. Peleg. "Computing Occluding and Transparent Motions" *International Journal Journal of Computer Vision*, 12(1):5–16, Jan. 1994.

M. Irani, B. Rousso, and S. Peleg. "Recovery of Ego–motion Using Image Stabilization" In *IEEE Conference on Computer Vision and Pattern Recognition*, pp. 451–460, Seattle, WA, Jun. 1994.

Rakesh Kumar, P. Anandan, and K. Hanna "Shape Recovery from Multiple Views: A Parallax Based Approach", In *DARPA IU Workshop*, Monterey, CA, Nov. 1994.

Rakesh Kumar, P. Anandan, M. Irani, J. R. Bergen, and K. J. Hanna. "Representation of Scenes From Collections of Images" In *Workshop on Representations of Visual Scenes*, 1995.

J. M. Lawn and R. Cipolla. "Robust Egomotion Estimation From Affine Motion Parallax" In *European Conference on Computer Vision*, pp. 205–210, May 1994.

F. Meyer and P. Bouthemy. "Region–based Tracking In Images Sequences" In *European Conference on Computer Vision*, pp. 476–484, Santa Margarita Ligure, May 1992.

Harpreet Sawhney. "3d Geometry From Planar Parallax" In *Proc. CVPR 92*, Jun. 1994.

A. Shashua "Projective Structure From Uncalibrated Images: Structure From Motion and Recognition" *IEEE Transactions On Pattern Analysis and Machine Intellegience*, 16:778–790, 1994.

A. Shashua. "Algebraic Functions For Recognition" *IEEE Transactions on Pattern Analysis and Machine Machine Intellegience*, 17:779–789, 1995.

A. Shashua and N. Navab. "Relative Affine Structure: Theory and Application to 3d Reconstruction From Perspective Views" In *IEEE Conference on Computer Vision and Pattern Recognition*, pp. 483–489, Seattle, WA., Jun. 1994.

A. Shashua and M. Werman, "Trilinearity of Three Perspective Views and its Associated Tensor" In Inter–*International Conference on Computer Vision*, pp. 920–925, Cambridge, MA Jun. 1995.

M. Shizawa. "On Visual Ambiguities Due To Transparency In Motin and Stereo" In *European Conference on Computer Vision*, pp. 411–419, Santa Margarita Ligure, May 1992.

M. Shizawa and K. Mase. "Principle of Superposition: A Common Computational Framework for Analysis of Multiple Motion" In *IEEE Workshop on Visual Motion*, pp. 164–172, Princeton, New Jersey, Oct. 1991.

M.E. Spetsakis and J. Aloimonos. "A Unified Theory of Structure from Motion" In *DARPA IU Workshop*, pp. 271–283, 1990.

P.H.S. Torr and D.W. Murray. "Stochastic Motion Clustering". In *European Conference on Computer Vision*, pp. 328–337, May 1994.

P.H.S. Torr, A. Zisserman, and S.J. Maybank. "Robust Detection of Degenerate Configurations for the Fundamental Matrix" In *International Conference on Computer Vision*, pp. 1037–1042, Cambridge, MA, Jun. 1995.

D. Weinshall, M. Werman and A. Shashua. Shape Tensors for Efficient and Learnable Indexing In *Workshop on Representations of Visual Scenes*, 1995.

Andrew Zisserman, "A Case Against Epipolar Geometry", In *Applications of Invariance in Computer Vision*, pp. 35–50, Ponta Delgada, Azores, Oct. 1993.

International Search Report.

Sabata et al., Estimation of Motion From a Pair of Range Images: A Review, Image Understanding, Nov. 1991, vol. 54, No. 3, pp. 309–324.

Wuller et al., Computer Mapping and Visualization of Facilities for Planning of D&D Operations, Proceedings of the Fifth International Conference on Radioactive Waste Management and Environmental Remediation, 1995, vol. 2, pp. 1749–1753.

Harpreet Sawhney, "Simplifying Motion Structure Analysis Using Planar Parallax and Image Warping", 1994, IEEE. pp. 403–408.

EPO Search Report, May 10, 2000.

N. M. Vaidya et al.; "Stereopsis and Image Registration from Extended Edge Features In the Absence of Camera Pose Information", Proceedings of the Computer Society Conference on Computer Vision and Patter rEcognition, US, Los Alamitos, IEEE Comp. Soc. Press, Jun. 3–6, 1991, pp. 76–82.

M. Shizawa; "Direct Estimation of MIltiple Disparities for Transparent Multiple Surface in Binocular Stereo"; Conference on Computer Vision, US, Los Alamitos, IEEE Comp Soc. Press, vol. Conf. 4, 1993, pp. 447–454.

A. Shashua; "Progjective Depth: A geometric Invarian for 3D Reconstruction From Two Perspective/Orthographic Views and For Visual Recognition"; Proceedings of the International Conference on Computer Vision, US, Los Alamitos, IEEE Comp. Soc. Press, vol. Conf. 4, 1993, pp. 583–590.

P. Anadan et al.; "Video as an Image Data Source: Efficient Representation and Applications"; Proceedings of the International Conference on Image Processing, (ICIP), US, Los Alamitos, IEEE Comp. Soc. Press, 1995, pp. 318–321.

* cited by examiner

METHOD AND APPARATUS FOR THREE-DIMENSIONAL SCENE PROCESSING USING PARALLAX GEOMETRY OF PAIRS OF POINTS

This non-provisional U.S. national application, filed under 35 U.S.C. §111(a) claims, under 35 U.S.C. §119(e)(1), the benefit of the filing date of provisional U.S. application no. 60/011,524, filed under 35 U.S.C. §111(b) on Feb. 12, 1996.

FIELD OF THE INVENTION

The invention generally relates to image processing systems and, more particularly, to a method and apparatus for processing the parallax geometry of pairs of points within three-dimensional scene.

BACKGROUND OF THE INVENTION

The analysis of three dimensional scenes from image sequences has a number of goals. These goals include, but are not limited to: (i) the recovery of 3D scene structure, (ii) the detection of moving objects in the presence of camera induced motion, and (iii) the synthesis of new camera views based on a given set of views.

The traditional approach to these types of problems has been to first recover the epipolar geometry between pairs of frames and then apply that information to achieve the above-mentioned goals. However, this approach is plagued with the difficulties associated with the recovery of the epipolar geometry.

Recent approaches to 3D scene analysis have attempted to overcome some of the difficulties in recovering the epipolar geometry by decomposing the motion into a combination of a planar homography and residual parallax. The residual parallax motion depends on the projective structure, and the translation between the camera origins. While these methods remove some of the ambiguities in estimating camera rotation, they still require the explicit estimation of the epipole itself, which can be difficult under many circumstances. In particular, epipole estimation is ill-conditioned when the epipole lies significantly away from the center of the image and the parallax motion vectors are nearly parallel to each other. Also, when there are only a small number of parallax vectors and the scene contains moving objects, these objects incorrectly influence the estimation of the epipole.

In general, the treatment of multipoint geometry assumes that the scene is static and relies on the fact that almost all points selected for the shape estimation are known to belong to a single rigid body. In its current form, this class of methods has drawbacks, for example, these methods do not address the problem of shape recovery in dynamic scenes, in particular when the amount of image motion due to independent moving object is not negligible.

SUMMARY OF THE INVENTION

The present invention involves a technique for image processing which receives a plurality of two dimensional images representative of a scene, computes a parallax-related constraint for a pair of points within the plurality of images, applies the parallax-related constraint to a plurality of points within the plurality of images in order to generate information representative of whether a given point within the plurality of images is consistent with the parallax-related constraint; and uses the generated information for an image processing task related to the received plurality of images.

BRIEF DESCRIPTION OF THE DRAWINGS

The teachings of the present invention can be readily understood by considering the following detailed description in conjunction with the accompanying drawings in which.

To facilitate understanding, identical reference numerals have been used, where possible, to designate identical elements that are common to the figures.

DETAILED DESCRIPTION

Overview

Figure 1:
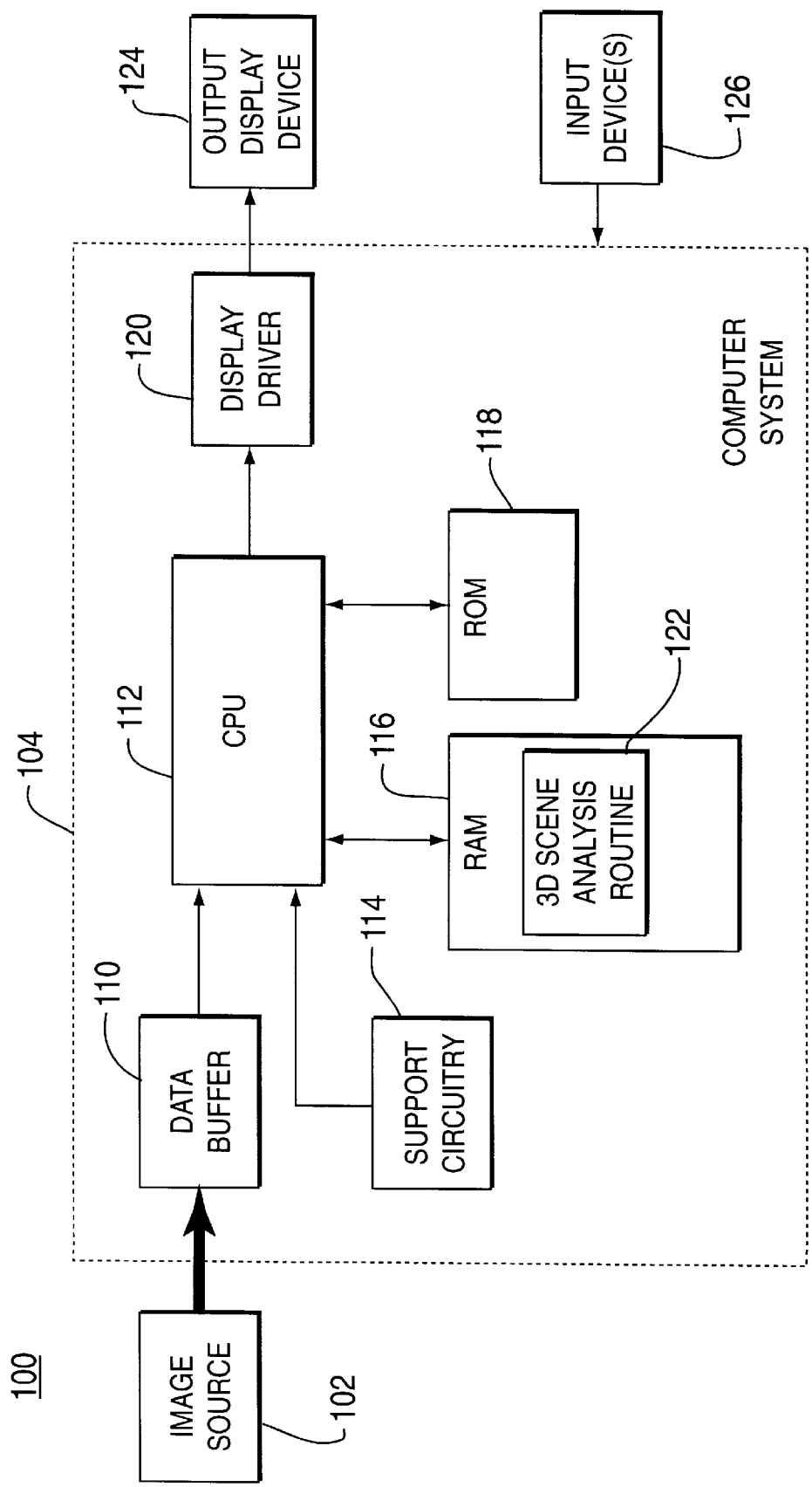
FIG. 1 depicts a block diagram of a three-dimensional scene analysis system.

The present invention uses, in various image processing tasks, the geometric relationships between the parallax displacements of two or more points within two or more images. The invention applies these relationships to various image processing tasks such as (i) the recovery of 3D scene structure, (ii) the detection of moving objects in the presence of camera induced motion, and (iii) the synthesis of new camera views based on a given set of views.

An important advantage of the present invention is the ability to effectively operate in difficult image processing situations (e.g., when there are a small number of parallax vectors, when the epipole estimation is ill-conditioned, and in the presence of moving objects). The present invention does not require the recovery of epipoles during processing; therefore, it applies to situations when the accurate recovery of the epipole is difficult. Moreover, the present techniques for 3D scene analysis are applicable when only a small set of parallax vectors is available. In fact, the planar parallax of a single point can be used as a reference to recover the structure of the entire scene, and to determine whether other points belong to the static scene or to a moving object.

The results presented herein are expressed in terms of the residual parallax displacements of points after canceling a planar homography. The decomposition of image motion into a homography plus parallax was shown to be more robust, yet more general, than the decomposition into rotation plus translation. Techniques for estimating the planar homography from pairs of images is described in J. R.

Bergen, P. Anandan, K. J. Hanna, and R. Hingorani, "Hierarchical model-based motion estimation" *European Conference on Computer Vision*, pages 237–252, Santa Margarita Ligure, May 1992, which is herein incorporated by reference.

In the present invention, a parallax-based structure constraint is derived that relates the projective structure of two points to their image positions and their parallax displacements. By eliminating the relative projective structure of a pair of points between three frames, a constraint, referred to as the parallax-based rigidity constraint, on the parallax displacements of two points moving as a rigid object over those frames is derived.

Also presented below is an alternative way of deriving the parallax-based rigidity constraint. In the alternative derivation, the constraint is determined geometrically rather than algebraically. Doing so leads to a simple and intuitive geometric interpretation of the multiframe rigidity constraint and to the derivation of a dual point to the epipole.

Examples of applications of these parallax-based constraints to solving three important problems in 3D scene analysis are also described. The applications include: (i) the recovery of 3D scene structure, (ii) the detection of moving objects in the presence of camera induced motion, and (iii) the synthesis of new camera views based on a given set of views.

Finally, the generalization of the constraint to full image motion by including the planar homography component is described.

Exemplary Embodiment

Turning to the figures, FIG. 1 depicts a block diagram of a three-dimensional scene analysis system 100 suitable for implementing of the present invention. The system contains an image source 102, a computer system 104, one or more output devices 106 and one or more input devices 108. The image source 102 can be a video camera, an infrared camera, or some other sensor that generates a series of two-dimensional images representing a scene. Alternatively, the image source can be a storage device such as a video tape recorder, disk drive or some other means for storing sequential images representing a scene. The system generally processes digital images; therefore, if the image source produces analog images, a digitizer (not shown) is used between the image source and the computer system.

The general purpose computer 104 facilitates image processing, scene analysis and image display. Specifically, the computer system contains a data buffer 110, a central processing unit (CPUT) 112, support circuitry 114, random access memory (RAM) 116, read only memory (ROM) 118, and a display driver 120. Additionally, a user interacts with the computer system through one or more input devices 108 such as a keyboard, mouse, trackball, touchpad, and the like. Also, the computer systems displays the images and various graphical interface displays (screens) on the output display device 106 such as a computer monitor. Alternatively, the computer system may also interact with other output display devices such as a printer to provide a "hard copy" of any display that appears on the computer monitor.

The data buffer 110 provides data rate equalization (frame buffering) between the image source and the CPU. Typically, this buffer is a first-in, first-out (FIFO) buffer. Such buffers are typically used to provide a constant data rate to the CPU while providing flexibility in the data rates that can be generated by an image source.

The CPU 112 is typically a general purpose processor such as a PowerPC, Pentium, or some other generally available processor. PowerPC is a registered trademark of International Business Machines of Armonk, N.Y. and Pentium is a registered trademark of Intel Corporation of Santa Clara, Calif. Since the software implementation of the present invention is not required to execute on any specific processor, the routines of the present invention can be executed upon any type of processor or combination of processors in a parallel processing computer environment. In addition, rather than using a general purpose computer, the scene analysis may be accomplished within a real-time image processor.

The CPU 112 operates in conjunction with various other circuits such as RAM 116, ROM 118 and support circuitry 114 such as co-processor(s), clock circuits, cache, power supplies and other well-known circuits. The operation and interrelationship of these various computer components is well-known in the art and does not require further explanation. The display driver 120 may be a video card, printer driver or other common driver software or hardware as required by the output device(s) 106.

The RAM 116 stores the software implementation of the present invention. Typically, the routines of the invention are stored in a mass storage device (not shown) and recalled for temporary storage in the RAM 116 when executed by the CPU 112. In FIG. 1, the invention is embodied in a three-dimensional scene analysis routine 122.

A. Parallax-Based Constraints on Pairs of Points

A constraint on the parallax motion of pairs of points between two image frames that represent a three-dimensional scene as imaged by a video camera is described below. The derived constraint can be used to recover a relative 3D structure invariant of two points from their parallax vectors alone, without any additional information, and in particular, without requiring the recovery of the camera epipoles.

The parallax constraint is extended to multiple frames to form a rigidity constraint on any pair of image points (similar to the trilinear constraint). Namely, inconsistencies in the 3D motion of two points that belong to independently moving 3D objects can be detected based on their parallax displacements among three (or more) frames, without the need to estimate any 3D information.

To derive the parallax constraint, first, the decomposition of the image motion into a homography (i.e., the image motion of an arbitrary planar surface) and residual parallax displacements is described. This decomposition is well-known in the art.

1. The Planar Parallax Notations

Figure 2:
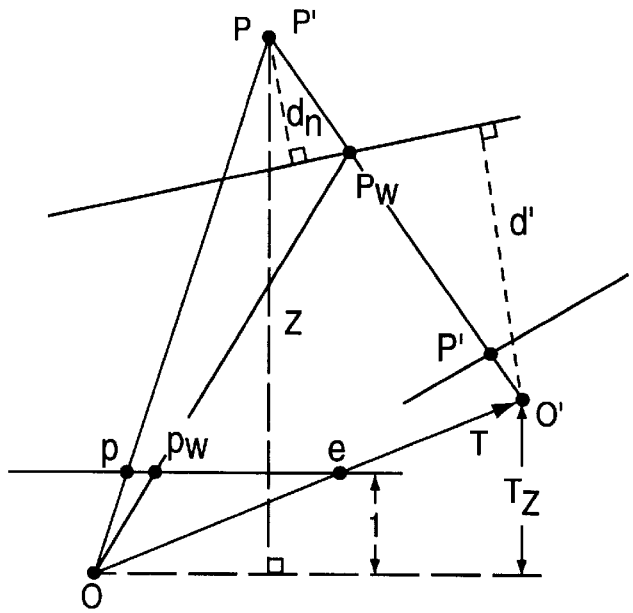
FIG. 2 provides a geometric illustration of the planar homography plus parallax decomposition.

FIG. 2 provides a geometric interpretation of the planar parallax. Let $\vec{P}=(X,Y,Z)^T$ and $\vec{P}\,'=(X',Y',Z')^T$ denote the Cartesian coordinates of a scene point with respect to different camera views, respectively. Let $\vec{x}=(x,y)^T$ and $\vec{x}\,'=(x',y')^T$ denote the corresponding coordinates of the scene point as projected onto the image planes at the two camera positions, respectively. Let $$\vec{p}=(x,y,1)^T=\frac{1}{Z}\vec{P} \quad \text{and} \quad \vec{p}\,'=(x',y',1)^T=\frac{1}{Z'}\vec{P}\,'$$

denote the same point in homogeneous coordinates, respectively.

Let S be an arbitrary planar surface and A the homography that aligns the planar surface S between the second and first frame (i.e., for all points $\vec{P} \in S, \vec{P}=A'\vec{P}\,'$). It can be shown that the image motion can be written (in homogeneous coordinates) as:

$$\vec{p} = \vec{p}_w + k(\vec{p}_w - \vec{e}) \tag{1}$$

In FIG. 2, $\vec{p}_w$ is the image point in the first frame which corresponds to warping $\vec{p}$ by the homography $$A' : \vec{p}_w = \frac{A'\vec{p}'}{a_3'^T \vec{p}}$$

($a_3'$ being the third row of A'). When $\vec{P}$ is on the 3D planar surface S, then $\vec{p}_w = \vec{P}$. Otherwise, the remaining displacement between $\vec{p}_w$ and $\vec{p}$ is proportional to the 3D projective structure (k) of $\vec{P}$ with respect to the planar surface S. Also, $$k = \frac{d_N}{Z} \frac{T_Z}{d'}, \quad \text{and } \vec{e} = \frac{1}{T_Z}\vec{T}$$

is the epipole in the first frame. $\vec{T} = (T_X, T_Y, T_Z)$ is the 3D translation between the two frames as expressed in the coordinate system of the first frame, $d_N$ is the distance of $\vec{P}$ from the plane S, and d' is the distance to the plane from the second camera center.

Shape Invariance: Note that the projective structure k depends both on the 3D structure and on the camera translation $\vec{T}$. However $$\frac{k_1}{k_2} = \frac{d_{N1}}{d_{N2}} \frac{Z_2}{Z_1}$$

for any two points $\vec{P}1$ and $\vec{P}2$ is view-independent, and is therefore a relative structure invariant with respect to camera motion.

When $T_Z = 0$, Eq. (1) can be rewritten in terms of $\vec{p}_w$ as:

$$\vec{p} = \vec{p}_w - \tau \vec{T}, \tag{2}$$

where $$\tau = \frac{d_N}{Zd'}.$$

Once again, $$\frac{\tau_1}{\tau_2} = \frac{d_{N1}}{d_{N2}} \frac{Z_2}{Z_1}$$

provides the same relative structure invariant.

Rewriting Eq. (1) in the form of image displacements yields, in homogeneous coordinates:

$$\vec{p}' - \vec{p} = (\vec{p}' - \vec{p}_w) - k(\vec{p}_w - \vec{e}), \tag{3}$$

and in 2D image coordinates:

$$\vec{u} = (\vec{x}' - \vec{x}) = (\vec{x}' - \vec{x}_w) - k(\vec{x}_w - \vec{x}_e) = \vec{u}_\pi + \vec{\mu}, \tag{4}$$

where $\vec{x} = (x,y)^T$ signifies the image point where $\vec{p} = (x,y,1)^T$ intersects the image plane of the first frame, $\vec{x}_e$ signifies the 2D image coordinates of the epipole in the first fame, $\vec{\mu}_\pi$ denotes the planar part of the 2D image motion (the homography due to S), and $\vec{\mu}$ denotes the residual parallax 2D motion.

Similarly, when $T_Z = 0$ (Eq. (2)):

$$\vec{u} = (\vec{x} - \vec{x}') = (\vec{x} - \vec{x}_w) + \tau \vec{t} = \vec{u}_\pi + \vec{\mu}, \tag{5}$$

where $t = (T_X, T_Y)^T$.

Eqs. (4) and (5) provide the form of parallax notation that will be used in the remaining of the paper. Note that they are expressed in terms of 2D image coordinates. Although we derived the parallax notation differently for $T_Z = 0$ and $T_Z \neq 0$, they will be unified and treated as a single case in the following sections.

2. The Parallax-Based Structure Constraint

Let $\vec{x}_1 = (x_1, y_1)$ and $\vec{x}_2 = (x_2, x_2)$ be two image points. We start by analyzing the case when $T_Z \neq 0$. From Eq. (4) we have:

$$\vec{\mu}_1 = x_{\vec{w}_1} - \vec{x}_1 = \kappa_1(\vec{x}_e - x_{\vec{w}_1})$$
$$\vec{\mu}_2 = x_{\vec{w}_2} - \vec{x}_2 = \kappa_2(\vec{x}_e - x_{\vec{w}_2}) \tag{6}$$

Let $$\gamma = \frac{d_N}{Z}$$

denote the part of the projective structure $\kappa$ which is point-dependent, i.e., $$\kappa_i = \gamma_i \frac{T_Z}{d'}$$

(i=1,2), then:

$$\vec{\mu}_1 = \frac{T_Z}{d'} \gamma_1 (\vec{x}_e - x_{\vec{w}_1}) \tag{7}$$

$$\vec{\mu}_2 = \frac{T_Z}{d'} \gamma_2 (\vec{x}_e - x_{\vec{w}_2}) \tag{8}$$

Therefore, $$\vec{\mu}_1 \gamma_2 - \vec{\mu}_2 \gamma_1 = \gamma_1 \gamma_2 \frac{T_Z}{d'} (x_{\vec{w}_2} - x_{\vec{w}_1}) \tag{9}$$

This last step eliminated the epipole $\vec{x}_e$. Eq. (9) entails that the vectors on both sides of the equation are parallel. Since $$\gamma_1 \gamma_2 \frac{T_Z}{d'}$$

is a scalar, we get:

$$(\vec{\mu}_1 \gamma_2 - \vec{\mu}_2 \gamma_1) \| \Delta x_{\vec{w}_{2,1}},$$

where $\Delta x_{\vec{w}_{2,1}} = (x_{\vec{w}_2} - x_{\vec{w}_1})$. This leads to the pairwise parallax constraint $$(\vec{\mu}_1 \gamma_2 - \vec{\mu}_2 \gamma_1)^T (\Delta x_{\vec{w}_{2,1}})_\perp = 0,$$

where $\vec{v}_\perp$ signifies a vector perpendicular to $\vec{v}$. From Eq. (6), $x_{\vec{w}_i} = (\vec{x}_i + \vec{\mu}_i)$, i=1,2. Hence, we can rewrite the parallax constraint in terms of the pixel coordinates of the two points and the parallax vectors as:

$$(\vec{\mu}_1\gamma_2 - \vec{\mu}_2\gamma_1)^T(\Delta x_{\vec{2},1} + \Delta \mu_{\vec{2},1})_\perp = 0, \quad (10)$$

where $\Delta x_{\vec{2}},1 = \vec{x}_2 - \vec{x}_1$, and $\Delta \mu_{\vec{2}},1 = \vec{\mu}_2 - \vec{\mu}_1$.

Eq. (10) provides a constraint on the structure parameters ($\gamma_1$ and $\gamma_2$) of the two points, using only their image (pixel) coordinates and their parallax vectors.

$\gamma_1$ and $\gamma_2$ depend on the second-view. However, if $\vec{x}_1$ is chosen so that its parallax vector $\vec{\mu}_1 \neq 0$ (i.e., $\vec{P}_1 \notin S$), then the parallax constraint can be rewritten in terms of the relative structure invariant (with respect to the first frame) of the two points, $$\frac{\gamma_2}{\gamma_1} = \frac{d_{N1}}{d_{N2}} \frac{Z_2}{Z_1}: \quad (11)$$

$$\left(\vec{\mu}_1 \frac{\gamma_2}{\gamma_1} - \vec{\mu}_2\right)^T (\Delta x_{\vec{2},1} + \Delta \mu_{\vec{2},1})_\perp = 0$$

When $T_Z = 0$, a constraint stronger than Eq. (11) can be derived:

$$\left(\vec{\mu}_1 \frac{\gamma_2}{\gamma_1} - \vec{\mu}_2\right) = 0,$$

however, Eq. (11), still holds. This is important, as we do not have a prior knowledge of $T_Z$ to distinguish between the two cases.

Therefore, given only the parallax vectors of the two image points, their relative structure $$\frac{\gamma_2}{\gamma_1}$$

can be recovered from Eq. (11):

$$\frac{\gamma_2}{\gamma_1} = \frac{\vec{\mu}_2^T (\Delta x_{\vec{2},1} + \Delta \mu_{\vec{2},1})_\perp}{\vec{\mu}_1^T (\Delta x_{\vec{2},1} + \Delta \mu_{\vec{2},1})_\perp},$$

or more concisely, $$\frac{\gamma_2}{\gamma_1} = \frac{\vec{\mu}_2^T (\Delta x_{\vec{w}_{2,1}})_\perp}{\vec{\mu}_1^T (\Delta x_{\vec{w}_{2,1}})_\perp}. \quad (12)$$

Figure 3:
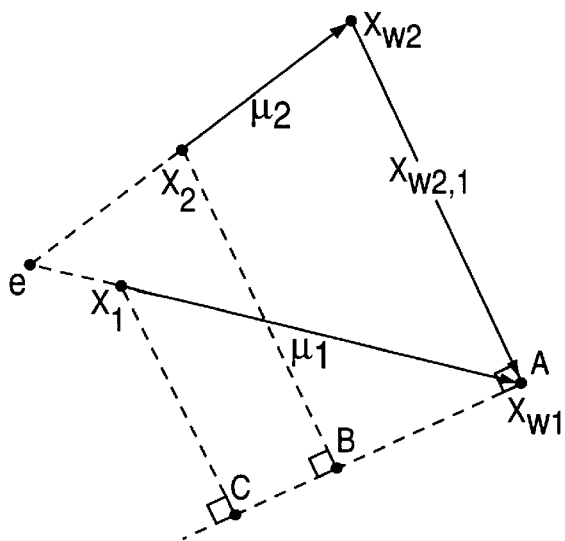
FIG. 3 depicts a geometric illustration of a pairwise parallax constraint.

FIG. 3 displays the constraint geometrically. As shown in this figure, $$\frac{\gamma_2}{\gamma_1} = \frac{AC}{AB}$$

where AC and AB are defined in FIG. 3.

The benefit of the constraint in Eq. (12) is that it provides this information directly from the positions and parallax vectors of the two points, without the need to go through the computation of the epipole, using as much information as one point can give on another.

Figure 4:
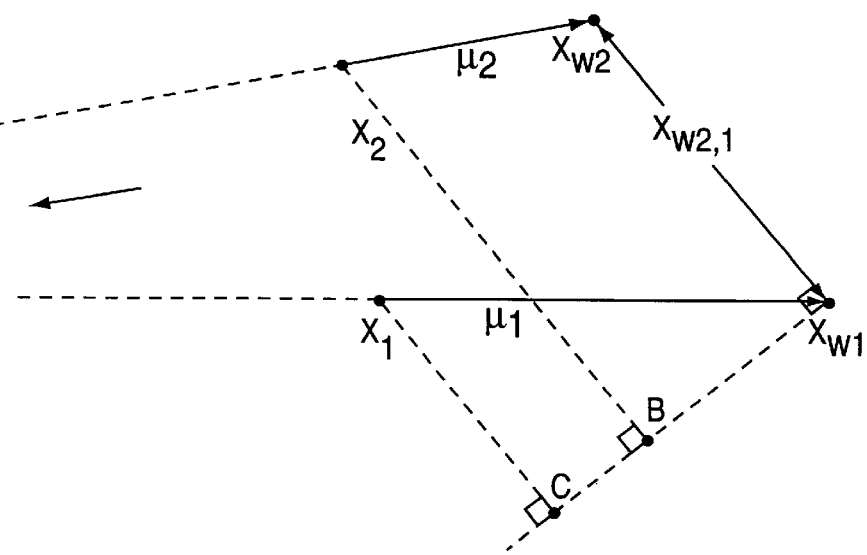
FIG. 4 depicts a geometric illustration of a scene where epipole estimation is unreliable, but the relative structure constraint can be reliably used to recover relative structure within the scene.

FIG. 4 graphically shows an example of a configuration in which estimating the epipole is very unreliable, whereas, estimating the relative structure directly from Eq. (12) is reliable.

3. The Parallax-Based Rigidity Constraint

In this section, how the parallax-based structure constraint can be extended to multiple frames, to form a rigidity constraint on pairs of image points that contains neither structure parameters nor camera geometry is described.

Rigidity Over Multiple Frames

Let $\vec{x}_1 = (x_1, y_1)$ and $\vec{x}_2 = (x_2, y_2)$ be two image points in the first (reference) frame.

Let $\vec{\mu}_i^j$ denote the 2D planar parallax motion of $\vec{x}_i$ from the first frame to frame j. From Eq. (6) we see that $x_{\vec{w}_i}^j$ can be computed by $\vec{x}_i + \vec{\mu}_i^j$, (i=1,2).

Using the structure invariance constraint of Eq. (12), for any two frames j and k we get:

$$\frac{\gamma_2}{\gamma_1} = \frac{\vec{\mu}_2^{j^T}(\Delta x_{\vec{w}_{2,1}})_\perp^j}{\vec{\mu}_1^{j^T}(\Delta x_{\vec{w}_{2,1}})_\perp^j} = \frac{\vec{\mu}_2^{k^T}(\Delta x_{\vec{w}_{2,1}})_\perp^k}{\vec{\mu}_1^{k^T}(\Delta x_{\vec{w}_{2,1}})_\perp^k}.$$

Multiplying by the denominators yields the rigidity constraint of the two points over three frames (reference frame, frame j, and frame k):

$$(\vec{\mu}_1^{k^T}(\Delta x_{\vec{w}_{2,1}})_\perp^k)(\vec{\mu}_2^{j^T}(\Delta x_{\vec{w}_{2,1}})_\perp^j) - (\vec{\mu}_1^{j^T}(\Delta x_{\vec{w}_{2,1}})_\perp^j)(\vec{\mu}_2^{k^T}(\Delta x_{\vec{w}_{2,1}})_\perp^k) = 0. \quad (13)$$

Based on the planar parallax motion trajectory of a single image point (e.g., $\vec{x}_1$) over several frames, the rigidity constraint (13) states a constraint on the planar parallax motion trajectory of any other point (e.g., $\vec{x}_2$) The rigidity constraint of Eq. (13) can therefore be applied to detect inconsistencies in the 3D motion of two image points (i.e., indicate whether the two image points are projections of 3D points belonging to a same or different 3D moving object) based on their parallax motion among three (or more) frames alone, without the need to estimate either camera geometry or structure parameters.

Rigidity Over Multiple Points

Instead of considering pairs of points over multiple frames, an alternative is to consider multiple points over two frames to come up with a different form of the rigidity constraint.

Let $\vec{x}_1 = (x_1, y_1), \vec{x}_2 = (x_2, y_2)$, and $\vec{x}_3 = (x_3, y_3)$ be three image points in the first (reference) frame. Let $\vec{\mu}_i$ denote the 2D planar parallax motion of $\vec{x}_i$ from the first frame to any other frame, and $x\vec{w}_i = \vec{x}_i + \vec{\mu}_i$, (i=1,2,3).

Using the shape invariance constraint of Eq. (12):

$$\frac{\gamma_2}{\gamma_1} = \frac{\vec{\mu}_2^T (\Delta x_{\vec{w}_{2,1}})_\perp}{\vec{\mu}_1^T (\Delta x_{\vec{w}_{2,1}})_\perp},$$

$$\frac{\gamma_3}{\gamma_2} = \frac{\vec{\mu}_3^T (\Delta x_{\vec{w}_{3,2}})_\perp}{\vec{\mu}_1^T (\Delta x_{\vec{w}_{3,2}})_\perp},$$

-continued $$\frac{\gamma_3}{\gamma_1} = \frac{\vec{\mu}_3^T (\Delta x_{\vec{w}_{3,1}})_\perp}{\vec{\mu}_1^T (\Delta x_{\vec{w}_{3,1}})_\perp},$$

Using the equality $$\frac{\gamma_3}{\gamma_1} = \frac{\gamma_3}{\gamma_2} \frac{\gamma_2}{\gamma_1}$$

and multiplying by the denominators, we get the rigidity constraint for three points over a pair of frames:

$$\vec{\mu}_3^T (\Delta x_{\vec{w}_{3,2}})_\perp \vec{\mu}_2^T (\Delta x_{\vec{w}_{2,1}})_\perp \vec{\mu}_1^T (\Delta x_{\vec{w}_{3,1}})_\perp - \vec{\mu}_2^T (\Delta x_{\vec{w}_{3,2}})_\perp \vec{\mu}_1^T (\Delta x_{\vec{w}_{2,1}})_\perp \vec{\mu}_3^T (\Delta x_{\vec{w}_{3,1}})_\perp = 0 \quad (14)$$

The benefit of the rigidity constraint (14) is in the fact that it provides this information directly from the positions and parallax vectors of the three points, without the need to go through the unstable computation of the epipole, using as much information as two points can give on the third.

B. Parallax Geometry and an Epipole Dual

In this section, a different way of deriving the parallax-based rigidity constraint is described. Rather than deriving the constraint algebraically, the alternative derivation uses geometry. This leads to a simple and intuitive geometric interpretation of the multiframe rigidity constraint, and to the derivation of a dual point to the epipole. Although this distinct image point (the epipole dual) is pointed out, the rigidity constraint itself does not require the estimation of the dual epipole, just as it did not require the estimation of the epipole itself.

Figure 6:
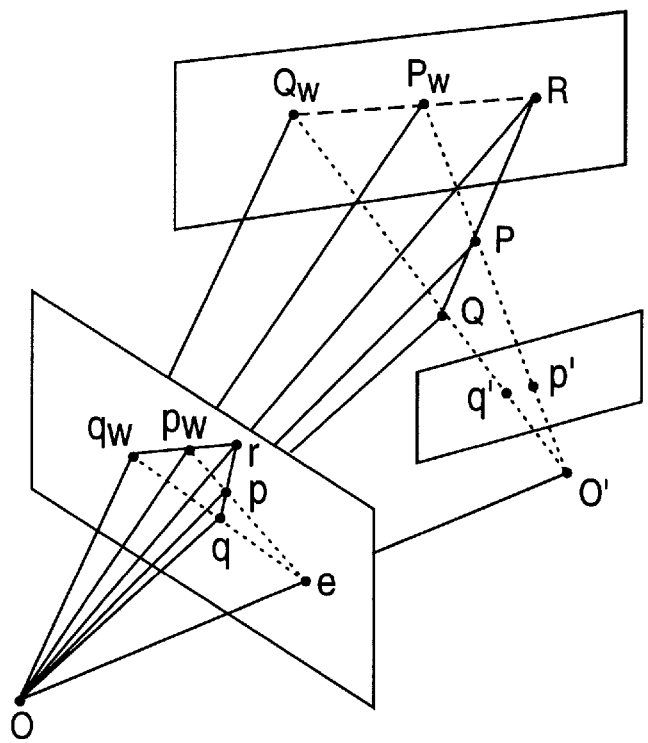
FIGS. 6 and 7 provide an illustration of parallax geometry and the dual of the epipole.

FIG. 6 illustrates the 3D geometric structure associated with the planar parallax of pairs of points between two frames. In this figure, S is the planar surface, and P and Q are the two scene points. As in the case of FIG. 2, $P_w$ and $Q_w$ are the intersections of rays O'P and O'Q with the plane S. Similarly, the points $\vec{p}_w$ and $\vec{q}_w$ on the reference image are the projections of $P_w$ and $Q_w$, and are therefore the points to which the planar homography transforms $\vec{p}\,'$ and $\vec{q}\,'$ respectively In other words, $\vec{p}_w = A'\vec{p}\,'$ and $\vec{q}_w = A'\vec{q}\,'$. Below, $\vec{p}_w$ and $\vec{q}_w$ are referred to as "warped points."

Let R be the intersection of the line connecting P and Q with the plane S. Note that the points P, Q, R, $P_w$ and $Q_w$ are co-planar. Hence, $P_w$ and $Q_w$ and R are colinear. Of course, P, Q and R are colinear by constructions.

Let $\vec{r}$ be the projection of R on the reference image plane. Since R∈S, $\vec{r} = \vec{r}_w$. Since $\vec{p}, \vec{q}, \vec{r}$ and $\vec{p}_w, \vec{q}_w, \vec{r}$ are the image projection of the colinear warped points P, Q, R, we can infer the following: $\vec{p}_w, \vec{q}_w$ and $\vec{r}$ and colinear and $\vec{p}, \vec{q}$ and $\vec{r}$ are colinear.

In other words, the line connecting $\vec{p}_w$ and $\vec{q}_w$ and the line connecting $\vec{p}$ and $\vec{q}$ intersect at $\vec{r}$, the image of the point R.

Note that the point $\vec{r}$ does not depend on the second camera view. Therefore, if multiple views are considered, then the lines connecting the warped points $\vec{p}_w^{\,j} = A^j \vec{p}^{\,j}$ and $\vec{q}_w^{\,j} = A^j \vec{q}^{\,j}$ (for any frame j), meet at $\vec{r}$ for all such views.

Figure 7:
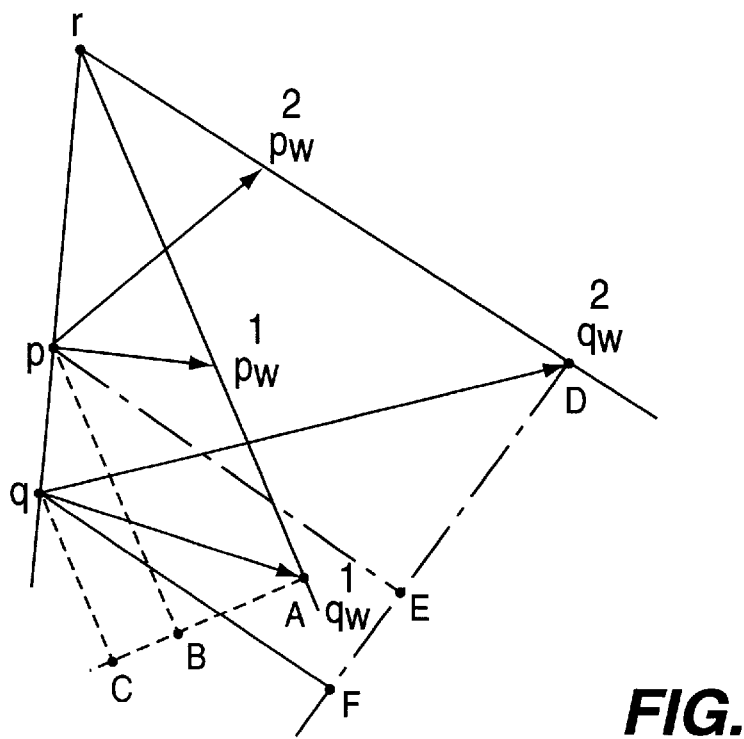

FIG. 7 illustrates the convergence of the lines. Referring to that figure, since the lines qC, pB and rA are parallel to each other and intersect the lines qpr and CAB:

$$\frac{qr}{pr} = \frac{CA}{BA} = \frac{\gamma_q}{\gamma_p}.$$

Similarly, $$\frac{qr}{pr} = \frac{FD}{ED} = \frac{\gamma_q}{\gamma_p}.$$

Hence $$\frac{qr}{pr} = \frac{CA}{BA} = \frac{FD}{ED}.$$

This is the same as the rigidity constraint derived in Eq. (13). Note, however, the rigidity constraint itself does not require the estimation of the point of convergence $\vec{r}$, just as it does not require the estimation of the epipole.

The point $\vec{r}$ is the dual of the epipole: the epipole is the point of intersection of multiple parallax vectors between a pair of frames, i.e., the point of intersection of all lines connecting each image point with its warped point between a pair of frames. Whereas, the dual point $\vec{r}$ is the point of intersection of all lines connecting a pair of points in the reference image and the corresponding pair of warped points from all other frames.

C. Applications Of Pairwise Parallax Geometry

In this section, how pairwise parallax geometry, in its various forms, provides an approach to handling some well-known problems in 3D scene analysis, in particular: (i) moving object detection, (ii) shape recovery, (iii) new view generation. It is shown that the parallax constraints provide the capability for solving these problems without having to first solve a "more complex" problem.

Figure 5:
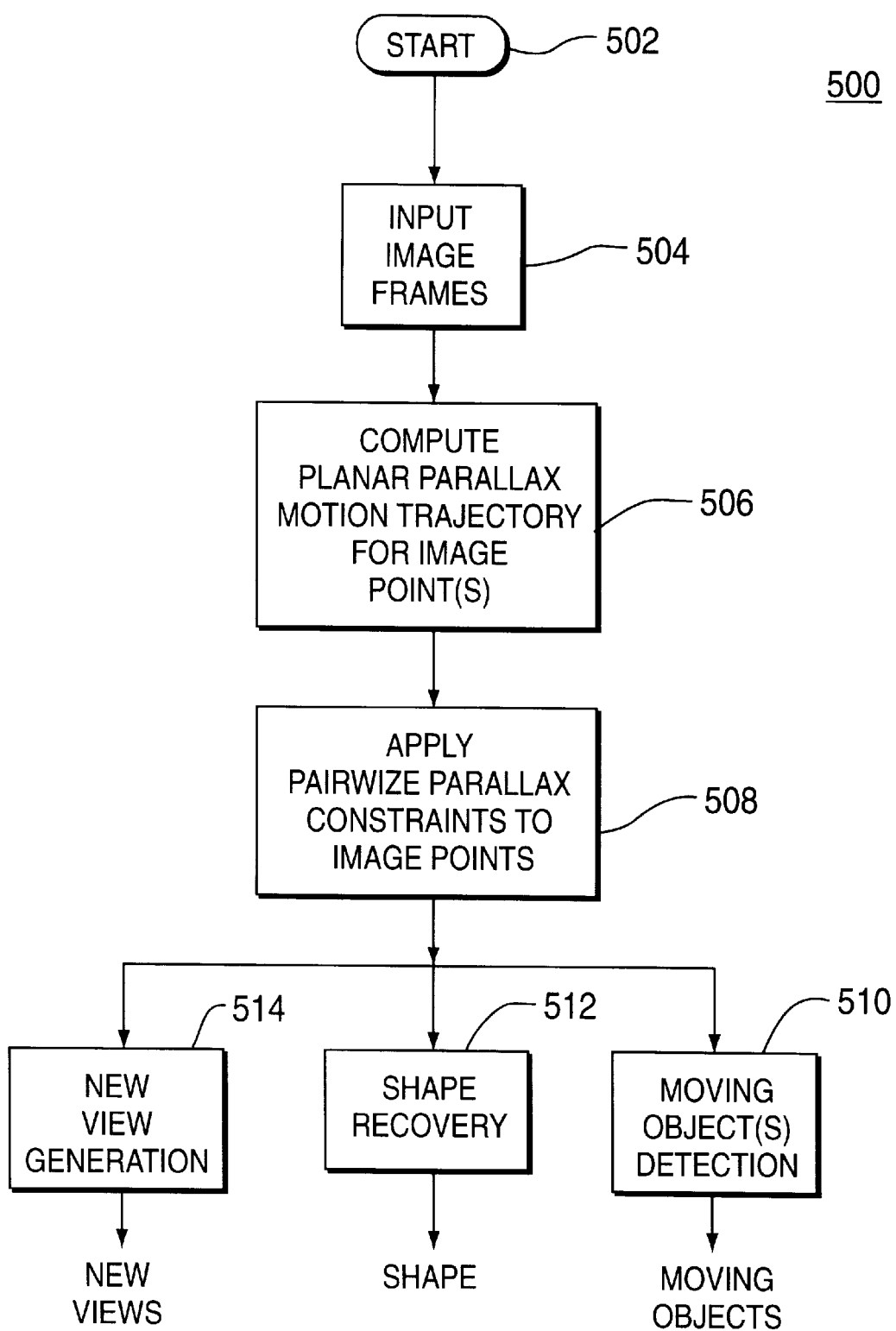
FIG. 5 depicts a flow diagram of a routine which utilizes the parallax constraint.

FIG. 5 depicts a flow diagram of a process for performing three-dimensional scene analysis which uses the shape constraint of Eq. (12) (or equivalently Eq. (11)) and the rigidity constraints of Eqs. (13) and (14). The process is represented as an executable software routine 500 that begins at step 502 and proceeds to step 504. At step 504, the routine is provided with a plurality of input images. At step 506, the routine computes a planar parallax motion (e.g., $\vec{\mu}_1$) for each point in the image. Then, at step 508, for each motion trajectory determined in step 506, one or more of the constraints of Eqs. (11), (12), (13), and (14) are applied with respect to all other points. The routine 500 uses the information from step 508 (e.g., information representing some image points as being consistent with the constraint and some image points being inconsistent with the constraint) within one or more image processing tasks. These tasks include, but are not limited to, moving object detection (step 510), shape recovery (step 512, and new view generation (step 514). Each of these illustrative applications of the inventive technique are described below.

1. Estimating Planar Parallax Motion

The estimation of the planar parallax motion used for performing the experiments presented in this section was done using two successive computational steps: (i) 2D image alignment to compensate for a detected planar motion (i.e., the homography in the form of a 2D parametric transformation, and (ii) estimation of residual image displacements between the aligned images (i.e., the parallax). Such a system is disclosed in U.S. provisional patent application Ser. No. 60/011,496 filed Feb. 12, 1996 (Attorney Docket No. 12040) and herein incorporated by reference.

2. Shape Recovery

The parallax-based structure constraint (Eq. (12)) can be used to recover a 3D relative structure between pairs of points directly from their parallax vectors. This implies that the structure of the entire scene can be recovered relative to a single reference image point (with non-zero parallax). Singularities occur when the denominator of the constraint (Eq. (12)) tends to zero, i.e., for points that lie on the line passing through the reference point in the direction of its parallax vector.

Figure 8A:
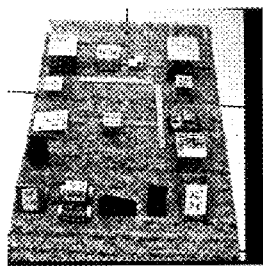
FIGS. 8$a$–$g$ depict a series of images used and produced during shape recovery that relies on a single parallax vector.
Figure 8B:
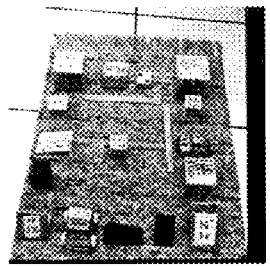
Figure 8C:
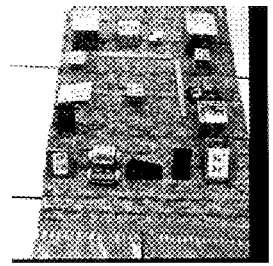
Figure 8D:
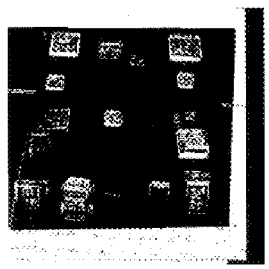
Figure 8E:
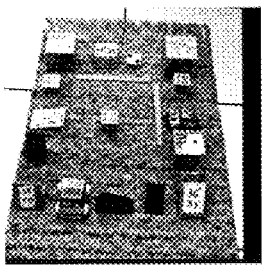
Figure 8F:
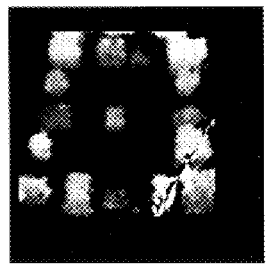

FIGS. 8a–g show an example of recovering structure of an entire scene relative to a single reference point. Three views obtained by a hand-held camera of a rug covered with toy cars and boxes, were used as the source data whose heights were measured. The detected 2D planar motion was that of the rug (FIG. 8d). A single point with non-zero planar parallax was selected as a reference point for estimating relative shape (FIG. 8e). FIG. 8f shows the recovered relative structure of the entire scene from two frames (FIGS. 8b and 8c). Regions close to the image boundary were ignored. The obtained results were quite accurate except along the singular line in the direction of the parallax of the reference point. The singular line is evident in FIG. 8f.

The singularities can be removed and the quality of the computed structure can be improved either by using multiple frames or by using multiple reference points:

Multiple frames: Singularities are removed by using multiple frames if their epipoles are non-colinear. Non-colinearity of epipoles can be detected through change in the parallax direction of the reference image point.

Multiple points: Singularities can be removed by using additional reference image points. An additional reference point should be chosen so that: (I) it does not lie on the singular line (i.e., in the direction of the parallax vector) of the first reference point (it should preferably be chosen on the line perpendicular to that), and (ii) the additional reference point should be first verified to move consistently with the first reference point through the rigidity constraint of Eq. (13) over a few frames.

Figure 8G:
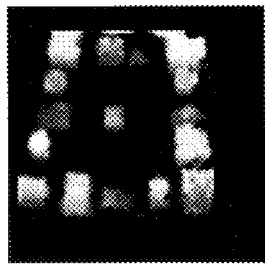

Combinations of multiple reference points over multiple frames can also be used. FIG. 8g shows an example of recovering structure of an entire scene from three frames relative to the same single reference point as in FIG. 8f. The singular line in FIG. 8f has disappeared.

The ability to obtain relatively good structure information even with respect to a single point has several important virtues:

It does not require the estimation of the epipole., and therefore, does not require dense parallax information.

Unlike conventional techniques for recovering structure, it provides the capability to handle dynamic scenes, as it does not require having a collection of image points which is know a priori to belong to the single 3D moving object.

Since it relies on a single parallax vector, it provides a natural continuous way to bridge the gap between 2D cases, that assume only planar motion exists, and 3D cases that rely on having parallax data.

3. Moving Object Detection

A number of techniques exist to handle multiple motions analysis in the simpler 2D case, where motions of independent moving objects are modeled by 2D parametric transformation. These methods, however, detect points with planar parallax motion as moving objects, as they have a different 2D image motion than the planar part of the background scene.

In the general 3D case, the moving object detetion problem is much more complex, since it requires detecting 3D motion inconsistencies. Typically, this is done by recovering the epipolar geometry. Trying to estimate epipolar geometry (i.e., camera motion) in the presence of multiple moving objects, with no prior segmentation, is extremely difficult. This problem becomes even more acute when there exists only sparse parallax information.

Figure 9A:
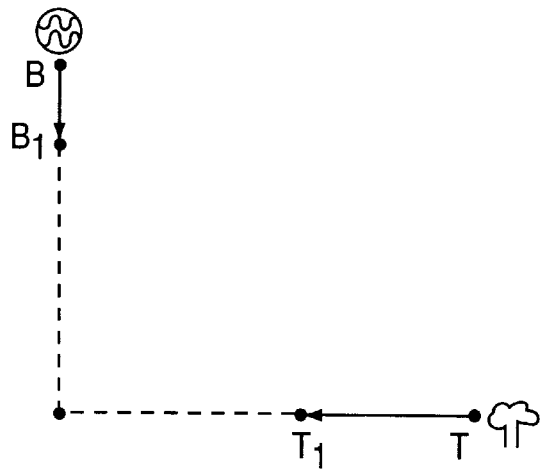
FIGS. 9$a$–$b$ illustrates reliable detection of 3D motion inconsistency with sparse parallax information using a ball and tree.

FIG. 9a graphically displays an example of a configuration in which estimating the epipole in the presence of multiple moving objects can produce relatively large errors, even when using clustering techniques in the epipole domain as suggested by some conventional techniques. Relying on the epipole computation to detect inconsistencies in 3D motion fails in detecting moving objects in such cases.

In FIG. 9a, the camera is translating to the right. The only static object with pure parallax motion is that of the tree. The ball is falling independently. The epipole may be incorrectly computed as e. The false epipole e is consistent with both motions.

Figure 9B:
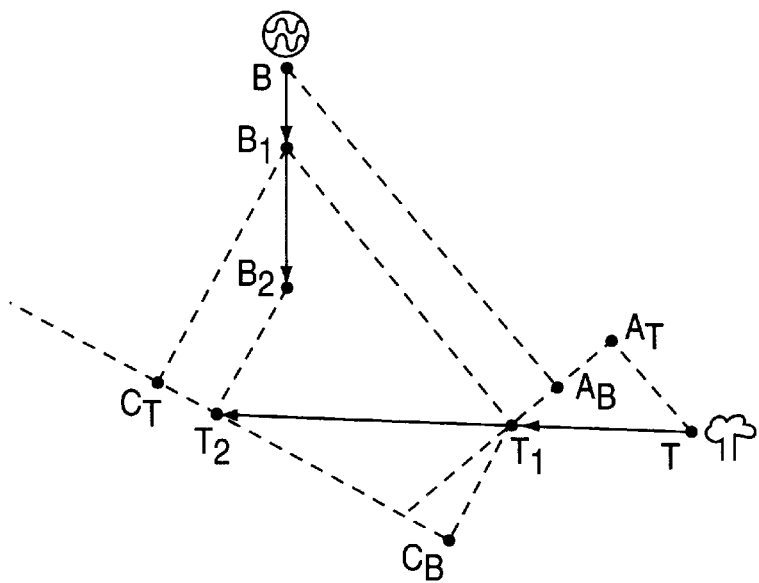

The parallax rigidity constraint (Eq. 13) can be applied to detect inconsistencies in the 3D motion of one image point relative to another directly from their "parallax" vectors over multiple (three or more) frames, without the need to estimate either camera geometry or shape parameters. This provides a useful mechanism for clustering (or segmenting) the "parallax" vectors (i.e., the residual motion after planar registration) into consistent groups belonging to consistently 3D moving objects even in cases such as in FIG. 9a where the parallax information is minimal and the independent motion is not negligible. FIG. 9b graphically illustrates how the rigidity constraint of Eq. (13), when applied, detects the 3D inconsistency over three frames.

Figure 10A:
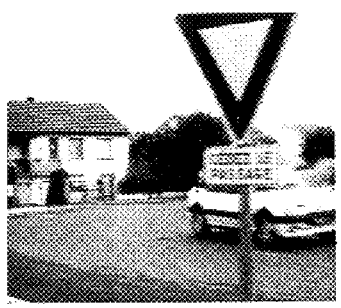
FIGS. 10$a$–$f$ are a series of images illustrating moving object detection relying on a single parallax vector.
Figure 10B:
Figure 10C:
Figure 10D:
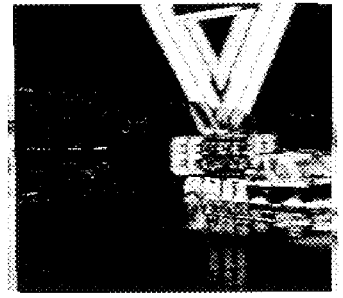
Figure 10E:
Figure 10F:

FIGS. 10a–f shows an example of using the rigidity constraint of Eq. (13) to detect 3D inconsistencies. In this sequence, the camera is in motion (translating from left to right), inducing parallax motion of different magnitudes on the house, road, and road-sign. The car moves independently from left to right. The detected 2D planar motion was that of the house. The planar parallax motion was computed after 2D registration of the three images with respect to the house (FIG. 10d). A single point on the road-sign was selected as a point of reference (FIG. 10e). FIG. 10f displays the measure of inconsistency of each point in the image with respect to the selected road-sign point. Bright regions indicate large values when applying the constraint of Eq. (13) (i.e., violations in 3D rigidity detected over three frames with respect to the road-sign point). The region which was detected as moving 3D-inconsistently with respect to the road-sign point corresponds to the car. Regions close to the image boundary were ignored. All other regions of the image were detected as moving 3D-consistently with the road-sign point. Therefore, assuming an uncalibrated camera, this method provides a mechanism for segmenting all non-zero residual motion vectors (after 2D planar stabilization) into groups moving consistently (in the 3D sense).

Figure 11A:
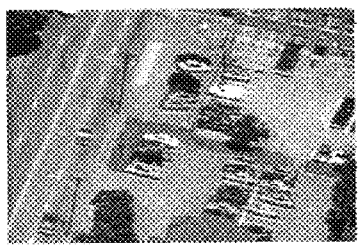
FIGS. 11$a$–$f$ are a series of images, like FIGS. 10$a$–$f$, illustrating moving object detection relying on a single parallax vector.
Figure 11B:
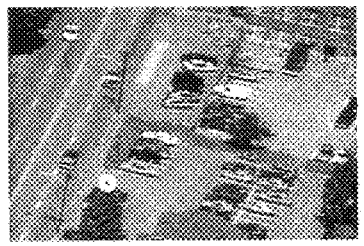
Figure 11C:
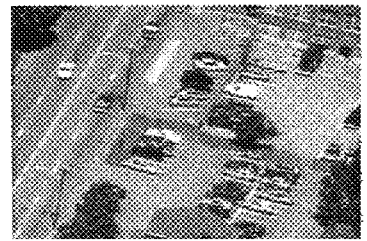
Figure 11D:
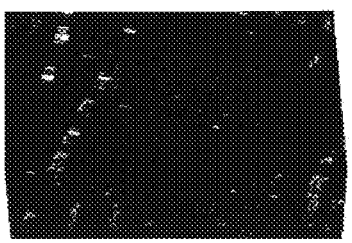
Figure 11E:
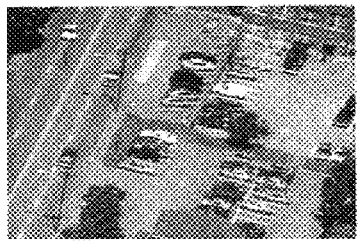
Figure 11F:
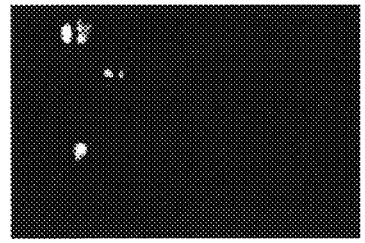

FIG. 11a–f shows another example of using the rigidity constraint of Eq. (13) to detect 3D inconsistencies. In this sequence, the camera is mounted on a heliocopter flying from left to right, inducing some parallax motion (of different magnitudes) on the house-roof and trees (bottom of the image), and on the electricity poles (by the road). Three cars move independently on the road. The detected 2D planar motion was that of the ground surface (FIG. 11d). A single point was selected on a tree as a point of reference (FIG. 11e). FIG. 11f displays the measure of inconsistency of each point in the image with respect to the selected reference point. Bright regions indicate 3D-inconsistency detected over three frames. The three cars were detected as moving inconsistently with the selected tree point. Regions close to the image boundary were ingored. All other image regions were detected as moving consistently with the selected tree point.

In the prior art, a rigidity constraint between three frames in the form of a trilinear tensor has been presented using regular image displacements. However, it requires having a collection of a set of image points which is known a priori to belong to the single 3D moving object. Selecting an inconsistent set of points leads to an erroneous tensor, and, hence, false moving object detection.

The ability of the parallax rigidity constraint of the present invention to detect 3D-inconsistency with respect to a single point, provides a natural way to bridge between 2D algorithms (which assume that any 2D motion different than the planar motion is an independently moving object), and 3D algorithms (which rely on having prior knowledge of a consistent set of points, or alternatively, dense parallax data).

4. New View Generation

This section describes an approach based on the parallax rigidity constraint for generating novel views using a set of "model" views.

Methods for generating new views based on recovering epipolar geometry are likely to be more noise sensitive than methods that generate the new view based on 2D information alone, i.e., without going from 2D through a 3D medium in order to reproject the information once again onto a new 2D image plane (the virtual view). The approach described below for new view generation does not require any epipolar geometry or shape estimation.

Given two "model" frames, planar parallax motion can be computed for all image points between the first (reference) frame and the second frame. An image point with non-zero parallax is selected, and a "virtual" parallax vector is defined for that point from the reference frame to the "virtual" frame to be generated. The rigidity constraint (Eq. 13) then specifies a single constraint on the virtual parallax motion of all other points from the reference frame to the virtual frame. Since each 2D parallax vector has two components (i.e., two unknowns), at least two "virtual" parallax vectors are needed to be specified in order to solve for all other virtual parallax vectors. Once the virtual parallax vectors are computed, the new virtual view can be created by warping the reference image twice: First, warping each image point by its computed virtual parallax. Then, globally warping the entire frame with a 2D virtual planar motion for the virtual homography.

Note that two virtual parallax vectors may not provide sufficient constraints for some image points. This is due to unfavorable location of those points in the image plane with respect to the two selected reference points and their parallax vectors. However, other image points, for whom the constraint was robust and sufficient to produce reliable virtual parallax, can be used (once their virtual parallax has been computed) as additional points to reliably constrain the virtual parallax of the singular points.

D. The Generalized Parallax Constraint

In this section, how the pairwise-parallax constraint (Eqs. (11, 12, 13, and 14)) can be extended to handle full image motion (as opposed to parallax motion), even when the homography is unknown, is described. This is useful for handling scenes that do not contain a physical planar surface. A form of a generalized parallax constraint between two frames in terms of the unknown homography parameters and the relative projective structure of pairs of points is described.

Eqs. (1) and (2) can be unified into a single form as:

$$\vec{p} = \vec{p}_w + \tau(T_Z \vec{p}_w - \vec{T}) = \frac{A'\vec{p}'}{a_3'^T \vec{p}'} + \tau\left(T_Z \frac{A'\vec{p}'}{a_3'^T \vec{p}'} - \vec{T}\right) \quad (15)$$

where $$\tau = \frac{d_N}{Zd'} = \gamma \frac{1}{d'}$$

(see notations above). A is an unknown homography from frame 2 to the first frame. It could relate to any planar surface in the scene, in particular a virtual plane. Importantly, before factoring out the structure, we first factor out the epipole, in a similar manner performed above.

Let $\vec{P}_1$ and $\vec{P}_2$ be two scene points with homogeneous coordinates $\vec{p}_1$ and $\vec{p}_2$. Then:

$$\frac{1}{\tau_1}\left(\vec{p}_1 - \frac{A'\vec{p}_1'}{a_3'^T \vec{p}_1'}\right) = T_Z \frac{A'\vec{p}_1'}{a_3'^T \vec{p}_1'} - \vec{T}$$

$$\frac{1}{\tau_2}\left(\vec{p}_2 - \frac{A'\vec{p}_2'}{a_3'^T \vec{p}_2'}\right) = T_Z \frac{A'\vec{p}_2'}{a_3'^T \vec{p}_2'} - \vec{T}$$

Subtracting the two equations eliminates $\vec{T}$, yielding:

$$\frac{1}{\tau_1}\left(\vec{p}_1 - \frac{A'\vec{p}_1'}{a_3'^T \vec{p}_1'}\right) - \frac{1}{\tau_2}\left(\vec{p}_2 - \frac{A'\vec{p}_2'}{a_3'^T \vec{p}_2'}\right) = T_Z\left(\frac{A'\vec{p}_1'}{a_3'^T \vec{p}_1'} - \frac{A'\vec{p}_2'}{a_3'^T \vec{p}_2'}\right) \quad (16)$$

The equality (16) entails that the vectors on both sides of the equation are parallel, which leads to:

$$\left(\frac{1}{\tau_1}\left(\vec{p}_1 - \frac{A'\vec{p}_1'}{a_3'^T \vec{p}_1'}\right) - \frac{1}{\tau_2}\left(\vec{p}_2 - \frac{A'\vec{p}_2'}{a_3'^T \vec{p}_2'}\right)\right)^T \left(\frac{A'\vec{p}_1'}{a_3'^T \vec{p}_1'} - \frac{A'\vec{p}_2'}{a_3'^T \vec{p}_2'}\right)_\perp = 0.$$

Multiplying both sides by $\tau_2$ gives the generalized parallax constraint in terms the relative projective structure $$\frac{\tau_2}{\tau_1} = \frac{\gamma_2}{\gamma_1}: \quad (17)$$

$$\left(\frac{\gamma_2}{\gamma_1}\left(\vec{p}_1 - \frac{A'\vec{p}_1'}{a_3'^T \vec{p}_1'}\right) - \left(\vec{p}_2 - \frac{A'\vec{p}_2'}{a_3'^T \vec{p}_2'}\right)\right)^T \left(\frac{A'\vec{p}_1'}{a_3'^T \vec{p}_1'} - \frac{A'\vec{p}_2'}{a_3'^T \vec{p}_2'}\right)_\perp = 0.$$

The generalized parallax constraint (17) is expressed in terms of the homography A, the image coordinates of a pair of points in two frames, and the relative projective structure of the two points. The generalized constraint does not involve the epipoles.

The generalized parallax constraint suggests a new implicit representation of general 2D image motion: Rather than looking at the representation of 2D image motion in terms of: homography plus epipole plus projective structure, it suggests an implicit representation of 2D image motion in terms of homography plus relative projective structure of pairs of points. Since this representation does not contain the epipole, it can be easily extended to multiple frames.

Using Eq. (17), the invariant relative projective structure $$\frac{\gamma_2}{\gamma_1}$$

can be expressed explicitly in terms of the plane homography and the image positions of the two points in the two frames:

$$\frac{\gamma_2}{\gamma_1} = \frac{\left(\vec{p}_2 - \frac{A'\vec{p}_2'}{a_3^T \vec{p}_2'}\right)^T \left(\frac{A'\vec{p}_1'}{a_3^T \vec{p}_1'} - \frac{A'\vec{p}_2'}{a_3^T \vec{p}_2'}\right)_\perp}{\left(\vec{p}_1 - \frac{A'\vec{p}_1'}{a_3^T \vec{p}_1'}\right)^T \left(\frac{A'\vec{p}_1'}{a_3^T \vec{p}_1'} - \frac{A'\vec{p}_2'}{a_3^T \vec{p}_2'}\right)_\perp} \quad (18)$$

Since the computations are invariant to new camera positions, it can be factored out over multiple frames (j and k):

$$\frac{\left(\vec{p}_2 - \frac{A'\vec{p}_2^j}{a_3^{jT} \vec{p}_2^j}\right)^T \left(\frac{A^j \vec{p}_1^j}{a_3^{jT} \vec{p}_1^j} - \frac{A^j \vec{p}_2^j}{a_3^{jT} \vec{p}_2^j}\right)_\perp}{\left(\vec{p}_1 - \frac{A^j \vec{p}_1^j}{a_3^{jT} \vec{p}_1^j}\right)^T \left(\frac{A^j \vec{p}_1^j}{a_3^{jT} \vec{p}_1^j} - \frac{A^j \vec{p}_2^j}{a_3^{jT} \vec{p}_2^j}\right)_\perp} =$$

$$\frac{\left(\vec{p}_2 - \frac{A^k \vec{p}_2^k}{a_3^{kT} \vec{p}_2^k}\right)^T \left(\frac{A^k \vec{p}_1^k}{a_3^{kT} \vec{p}_1^k} - \frac{A^k \vec{p}_2^k}{a_3^{kT} \vec{p}_2^k}\right)_\perp}{\left(\vec{p}_1 - \frac{A^k \vec{p}_1^k}{a_3^{kT} \vec{p}_1^k}\right)^T \left(\frac{A^k \vec{p}_1^k}{a_3^{kT} \vec{p}_1^k} - \frac{A^k \vec{p}_2^{k'}}{a_3^{kT} \vec{p}_2^k}\right)_\perp},$$

which leads to a rigidity constraint of the form:

$$\left(\vec{p}_2 - \frac{A'\vec{p}_2^j}{a_3^{jT} \vec{p}_2^j}\right)^T \left(\frac{A^j \vec{p}_1^j}{a_3^{jT} \vec{p}_1^j} - \frac{A^j \vec{p}_2^j}{a_3^{jT} \vec{p}_2^j}\right)_\perp \quad (19)$$

$$\left(\vec{p}_1 - \frac{A^k \vec{p}_1^k}{a_3^{kT} \vec{p}_1^k}\right)^T \left(\frac{A^k \vec{p}_1^k}{a_3^{kT} \vec{p}_1^k} - \frac{A^k \vec{p}_2^{k'}}{a_3^{kT} \vec{p}_2^k}\right)_\perp - \left(\vec{p}_2 - \frac{A^k \vec{p}_2^k}{a_3^{kT} \vec{p}_2^k}\right)^T$$

$$\left(\frac{A^k \vec{p}_1^k}{a_3^{kT} \vec{p}_1^k} - \frac{A^k \vec{p}_2^k}{a_3^{kT} \vec{p}_2^k}\right)_\perp \left(\vec{p}_1 - \frac{A^j \vec{p}_1^j}{a_3^{jT} \vec{p}_1^j}\right)^T \left(\frac{A^j \vec{p}_1^j}{a_3^{jT} \vec{p}_1^j} - \frac{A^j \vec{p}_2^j}{a_3^{jT} \vec{p}_2^j}\right)_\perp = 0.$$

Eq. (19) is a rigidity constraint on a pair of points across three frames. Like the trilinear tensor of the prior art, it involves the parameters of two homographies across three frames. Unlike the trilinear tensor, it does not contain the epipole, but instead, is expressed on pairs of points.

The trilinear constraints are based on a initial reference points, and any additional point adds four linearly independent equations to constrain the unknowns of the tensor (which are combinations of the homography parameters and the epipoles).

In the generalized parallax rigidity constraint, the basis is a pair of points. Here also, any additional point adds four linearly independent rigidity constraints. These can be derived through factoring out $T_Z$ from Eq. (16) with the additional third point (still within a pair of frames) to form the four linearly independent equations over three frames.

Although various embodiments which incorporate the teachings of the present invention have been shown and described in detail herein, those skilled in the art can readily devise many other varied embodiments that still incorporate these teachings.

We claim:

1. Method for image processing to detect a moving object comprising the steps of:
   a) receiving a plurality of two dimensional images representative of a scene, each image being taken at a respectively different time;
   b) computing a planar homography aligning a surface in the scene among the plurality of images;
   c) computing parallax vectors with respect to respective corresponding points in each of two images of the plurality of images;
   d) using the parallax vectors and additional information in the plurality of images, computing a parallax rigidity constraint for the plurality of images, the parallax rigidity constraint being independent of any epipole;
   e) applying the parallax rigidity constraint to a further plurality of points within the plurality of images in order to generate information representative of whether a given point within the plurality of images is consistent with the parallax rigidity constraint; and
   f) using the generated information to perform moving object detection related processing on the received plurality of images.

2. The method of claim 1, wherein the parallax vectors are computed with respect to a pair of corresponding points in the two images and the additional information used to compute the parallax rigidity constraint is a pair of points in a third image of the plurality of images which corresponds to the pair of corresponding points in the two images.

3. The method of claim 1, wherein the parallax vectors are computed with respect to a pair of corresponding points in the two images and the additional information used to compute the parallax rigidity constraint is a third corresponding point in each of the two images.

4. Method for image processing to recover scene structure comprising the steps of:
   a) receiving a plurality of two dimensional images representative of a scene, wherein each image is taken from an arbitrary camera position;
   b) computing a planar homography aligning a surface in the scene among the plurality of images;
   c) computing parallax vectors with respect to respective corresponding points in each of two images of the plurality of images;
   d) using the parallax vectors and additional information in the plurality of images, computing a parallax rigidity constraint for the plurality of images, the parallax rigidity constraint being independent of any epipole;
   e) applying the parallax rigidity constraint to a further plurality of points within the plurality of images in order to generate information representative of whether a given point within the plurality of images is consistent with the parallax structure constraint; and
   f) using the generated information to perform recovery of scene structure related to the received plurality of images.

5. Method for image processing to generate new views comprising the steps of:
   a) receiving a plurality of two dimensional images representative of a scene, each image taken from an arbitrary camera position;

b) computing a planar homography aligning a surface in the scene among the plurality of images;

c) computing parallax vectors with respect to respective corresponding points in each of two images of the plurality of images;

d) using the parallax vectors and additional information in the plurality of images, computing a parallax rigidity constraint for the plurality of images, the parallax rigidity constraint being independent of any epipole;

e) applying the parallax rigidity constraint to a further plurality of points within the plurality of images in order to generate information representative of whether a given point within the plurality of images is consistent with the parallax rigidity constraint; and f) using the generated information to perform new view generation related to and based on the received plurality of images.

6. The method of claim 5, wherein the parallax vectors are computed with respect to a pair of corresponding points in the two images and the additional information used to compute the parallax rigidity constraint is a pair of points in a third image of the plurality of images which corresponds to the pair of corresponding points in the two images.

7. The method of claim 5, wherein the parallax vectors are computed with respect to a pair of corresponding points in the two images and the additional information used to compute the parallax rigidity constraint is a third corresponding point in each of the two images.

8. Apparatus for image processing comprising:

a source of two dimensional images representative of a scene;

a computer processor for processing the two dimensional images including:

means for receiving a plurality of two dimensional images representative of a scene;

means for computing a planar homography aligning a surface in the scene among the plurality of images;

means for computing parallax vectors with respect to the planar homography of a plurality of points among the plurality of images;

means for computing a parallax-related constraint directly from the positions of the plurality of points and the parallax vectors, the parallax-related constraint being independent of any epipole;

means for applying the parallax-related constraint to a further plurality of points within the plurality of images in order to generate information representative of whether a given point within the plurality of images is consistent with the parallax-related constraint;

means for using the generated information for an image processing task related to the received plurality of images and generating an output related thereto; and an output device for presenting the output of the image processing task.

9. The apparatus of claim 8, wherein the source of images includes a video camera.

10. The apparatus of claim 8, wherein the source of images includes an infra-red camera.

11. The apparatus of claim 8, wherein the source of images includes a storage device.

12. The apparatus of claim 11, wherein the storage device includes a video tape recorder.

13. The apparatus of claim 11, wherein the storage device includes a disk drive.

14. A computer-readable medium having stored thereon a plurality of instructions, the plurality of instructions including instructions which, when executed by a processor, cause the processor to perform the steps of:

a) receiving, in digital form, a plurality of two dimensional images representative of a scene;

b) computing a planar homography aligning a surface in the scene among the plurality of images;

c) computing parallax vectors with respect to the planar homography for a plurality of points among the plurality of images;

d) computing a parallax-related constraint directly from the positions of the plurality of points and the parallax vectors, the parallax-related constraint being independent of any epipole;

e) applying the parallax-related constraint to a further plurality of points within the plurality of images in order to generate information representative of whether a given point within the plurality of images is consistent with the parallax-related constraint; and f) using the generated information for an image processing task related to the received plurality of images.

15. The computer readable medium of claim 14, wherein the parallax-related constraint is a parallax structure constraint.

16. The computer readable medium of claim 14, wherein the parallax-related constraint is a parallax rigidity constraint.

17. The medium of claim 16, wherein the parallax vectors are computed with respect to a pair of corresponding points in the two images and the additional information used to compute the parallax rigidity constraint is a pair of points in a third image of the plurality of images which corresponds to the pair of corresponding points in the two images.

18. The medium of claim 16, wherein the parallax vectors are computed with respect to a pair of corresponding points in the two images and the additional information used to compute the parallax rigidity constraint is a third corresponding point in each of the two images.

19. Method for image processing comprising the steps of:

a) receiving a plurality of two dimensional images representative of a scene, the images taken from arbitrary camera positions;

b) computing a parallax-related constraint for a plurality of points within the plurality of images including the steps of:

i) warping the plurality of images to compensate for effects of scaling and rotation around the camera positions;

ii) computing parallax vectors for the plurality of points; and iii) computing the parallax-related constraint directly from the positions of the plurality of points and the parallax vectors, the parallax-related constraint being independent of any epipole;

c) applying the parallax-related constraint to a further plurality of points within the plurality of images in order to generate information representative of whether a given point within the plurality of images is consistent with the parallax-related constraint; and d) using the generated information for an image processing task related to the received plurality of images.

* * * * *